United States Patent
Richardson

(12) 
(10) Patent No.: US 6,412,853 B1
(45) Date of Patent: Jul. 2, 2002

(54) VEHICLE AIR DRAG REDUCTION SYSTEM USING LOUVERS

(76) Inventor: Gale D. Richardson, 3011 Hendee Rd., Jackson, MI (US) 49201-9001

( * ) Notice: Subject to any disclaimer, the term of this patent is extended or adjusted under 35 U.S.C. 154(b) by 0 days.

(21) Appl. No.: 09/705,633

(22) Filed: Nov. 3, 2000

(51) Int. Cl.$^7$ ............................................. B62D 35/00
(52) U.S. Cl. ............................. 296/180.1; 296/180.2; 180/903
(58) Field of Search ..................... 296/180.1, 180.2, 296/180.4; 180/903

(56) References Cited

U.S. PATENT DOCUMENTS

| | | | |
|---|---|---|---|
| 1,726,882 A | | 9/1929 | Boerner |
| 2,261,558 A | | 11/1941 | Orloff |
| 2,685,470 A | | 8/1954 | Werner |
| 2,899,150 A | | 8/1959 | Ellis, Jr. |
| 3,128,973 A | | 4/1964 | Dannenberg |
| 3,523,661 A | | 8/1970 | Rethorst |
| 3,578,264 A | | 5/1971 | Kuethe |
| 3,831,885 A | | 8/1974 | Kasper |
| 3,971,586 A | | 7/1976 | Saunders |
| 4,023,309 A | * | 5/1977 | Backward ...................... 49/62 |
| 4,180,290 A | | 12/1979 | Drews |
| 4,284,302 A | * | 8/1981 | Drews ...................... 296/180.1 |
| 4,546,021 A | * | 10/1985 | Mears ........................ 428/31 |
| 4,861,093 A | * | 8/1989 | Chspman ................. 296/180.1 |
| 4,887,681 A | | 12/1989 | Durm et al. |
| 4,932,705 A | * | 6/1990 | Miller ................. 296/180.1 X |
| 5,374,098 A | | 12/1994 | Nelson |
| 5,653,493 A | * | 8/1997 | Spears ...................... 296/180.2 |
| 5,923,245 A | * | 7/1999 | Klatt et al. .......... 296/180.1 X |
| 6,012,760 A | * | 1/2000 | Nozaki ...................... 296/146.9 |

FOREIGN PATENT DOCUMENTS

CH        219841        6/1942

\* cited by examiner

Primary Examiner—Joseph D. Pape
Assistant Examiner—Lori L Coletta

(57) ABSTRACT

A vehicle air drag reduction system using louvers is provided comprising at least one louver strip. Such strip has a top face, a bottom face, and a periphery formed therebetween. The louver strip further includes a coupling mechanism for allowing the coupling thereof to a body of a vehicle. A plurality of louver tabs are also provided having a long side edge thereof integrally coupled to the louver strip. Each louver tab extends upwardly and rearwardly thereby forming an acute angle with respect to a plane in which the louver strip resides.

1 Claim, 3 Drawing Sheets

VEHICLE AIR DRAG REDUCTION SYSTEM USING LOUVERS

CROSS REFERENCE TO RELATED APPLICATION

This application is a substitute for Application Ser. No. 08/903,599, filed Jul. 31, 1997, now abandoned.

BACKGROUND OF THE INVENTION

1. Field of the Invention

The present invention relates to spoilers and more particularly pertains to a new vehicle air drag reduction system using louvers for reducing the effects of vacuum and drag associated with forward movement of a vehicle.

2. Description of the Prior Art

The use of spoilers is known in the prior art. More specifically, spoilers heretofore devised and utilized are known to consist basically of familiar, expected and obvious structural configurations, notwithstanding the myriad of designs encompassed by the crowded prior art which have been developed for the fulfillment of countless objectives and requirements.

Known prior art spoilers include U.S. Pat. Nos. 1,726,882; 2,899,150; 3,523,661; 3,831,885; 4,180,290; 2,261,558; 3,128,973; 3,578,264; and 3,971,586.

In these respects, the vehicle air drag reduction system using louvers according to the present invention substantially departs from the conventional concepts and designs of the prior art, and in so doing provides an apparatus primarily developed for the purpose of reducing the effects of vacuum and drag associated with forward movement of a vehicle.

SUMMARY OF THE INVENTION

In view of the foregoing disadvantages inherent in the known types of spoilers now present in the prior art, the present invention provides a new Vehicle Air Drag Reduction System Using Louvers construction wherein the same can be utilized for reducing the effects of vacuum and drag associated with forward movement of a vehicle.

The general purpose of the present invention, which will be described subsequently in greater detail, is to provide a new vehicle air drag reduction system using louvers apparatus and method which has many of the advantages of the spoilers mentioned heretofore and many novel features that result in a new vehicle air drag reduction system using louvers which is not anticipated, rendered obvious, suggested, or even implied by any of the prior art spoilers, either alone or in any combination thereof.

To attain this, the present invention generally comprises a plurality of louver strips are provided each including a top face, a bottom face, and a periphery formed therebetween. Each louver strips includes a layer of adhesive formed on the bottom face thereof for allowing the coupling thereof to a body of a vehicle. Each of the louver strips further include a plurality of rectangular cutouts formed therein. Associated with each cut out is a rectangular louver tab having a long side edge thereof integrally coupled along and coincident with a front long edge of the corresponding rectangular cut. As shown in FIG. 3, each louver tab extends upwardly and rearwardly thereby forming an approximate 45 degree angle with respect to a plane in which the louver strip resides. As shown in FIG. 1, the louver strips include a first set of louver strips each having a rectangular configuration. The rectangular cut outs and louver tabs of the first set of louver strips are situated in a matrix of rows and columns. The first set of louver strips include a first louver strip adhered to a top surface of a trunk of the vehicle, a second louver strip adhered to a first rear side panel of the body of the vehicle, a third louver strip adhered to a second rear side panel of the body of the vehicle, and a fourth louver strip adhered to a lower surface of the vehicle. The forgoing strips thus define a vertically orientated closed loop which encompasses the rear of the vehicle. The first set of louver strips include a fifth louver strip adhered to a top surface of a top of a passenger compartment of the vehicle adjacent a rear extent thereof. Next provided is a second set of louver strips each having a generally triangular configuration. Similar to the first set, the second set of louver strips have rectangular cut outs and louver tabs which are situated in a matrix of rows and columns. The second set of louver strips including a first louver strip coupled to a first rear side panel of the passenger compartment of the vehicle and a second louver strip coupled to a second rear side panel of the passenger compartment of the vehicle. It should be noted that the louver tabs of the first and second set of louver strips are situated on the vehicle such that they are angled toward a rear of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle air drag reduction system using louvers apparatus and method which has many of the advantages of the spoilers mentioned heretofore and many novel features that result in a new vehicle air drag reduction system using louvers which is not anticipated, rendered obvious, suggested, or even implied by any of the prior art spoilers, either alone or in any combination thereof.

It is another object of the present invention to provide a new vehicle air drag reduction system using louvers which may be easily and efficiently manufactured and marketed.

It is a further object of the present invention to provide a new vehicle air drag reduction system using louvers which is of a durable and reliable construction.

An even further object of the present invention is to provide a new vehicle air drag reduction system using louvers which is susceptible of a low cost of manufacture with regard to both materials and labor, and which accordingly is then susceptible of low prices of sale to the consuming public, thereby making such vehicle air drag reduction system using louvers economically available to the buying public.

Still yet another object of the present invention is to provide a new vehicle air drag reduction system using louvers which provides in the apparatuses and methods of the prior art some of the advantages thereof, while simultaneously overcoming some of the disadvantages normally associated therewith.

Still another object of the present invention is to provide a new vehicle air drag reduction system using louvers for reducing the effects of vacuum and drag associated with forward movement of a vehicle.

Even still another object of the present invention is to provide a new vehicle air drag reduction system using louvers that includes at least one louver strip. Said louver strip has a top face, a bottom face, and a periphery formed therebetween. The louver strip further includes a coupling mechanism for allowing the coupling thereof to a body of a vehicle. A plurality of louver tabs are also provided having a long side edge thereof integrally coupled to the louver strip. Each louver tab extends upwardly and rearwardly thereby forming an acute angle with respect to a plane in which the louver strip resides.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
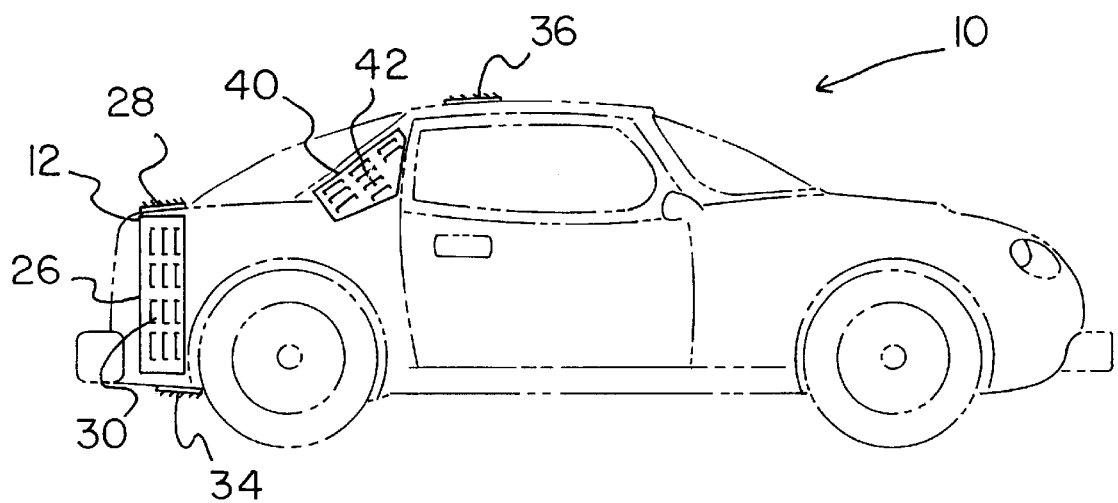
FIG. 1 is a side view of a new vehicle air drag reduction system using louvers according to the present invention.
Figure 2:
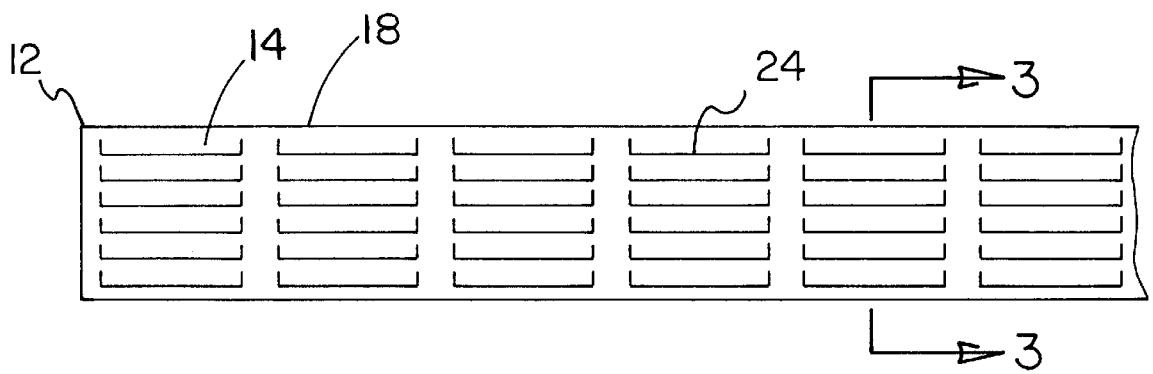
FIG. 2 is a top view of the present invention.

With reference now to the drawings, and in particular to FIGS. 1 through 5 thereof, a new vehicle air drag reduction system using louvers embodying the principles and concepts of the present invention and generally designated by the reference numeral 10 will be described.

Figure 3:
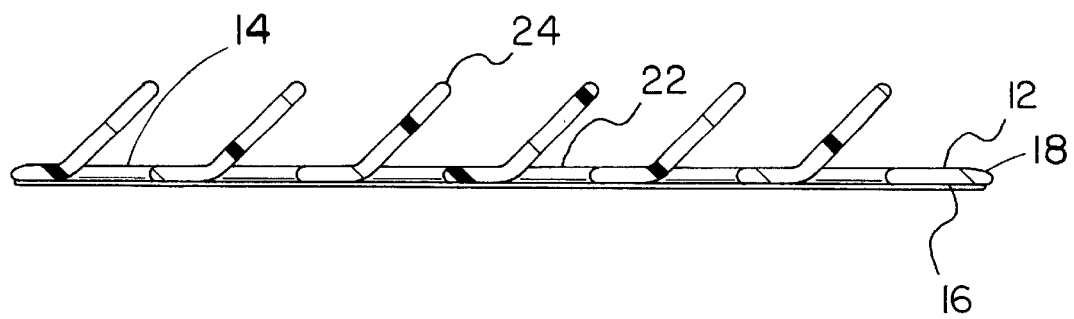
FIG. 3 is a cross-sectional view of the louver strips of the present invention taken along line 3—3 shown in FIG. 2.
Figure 4:
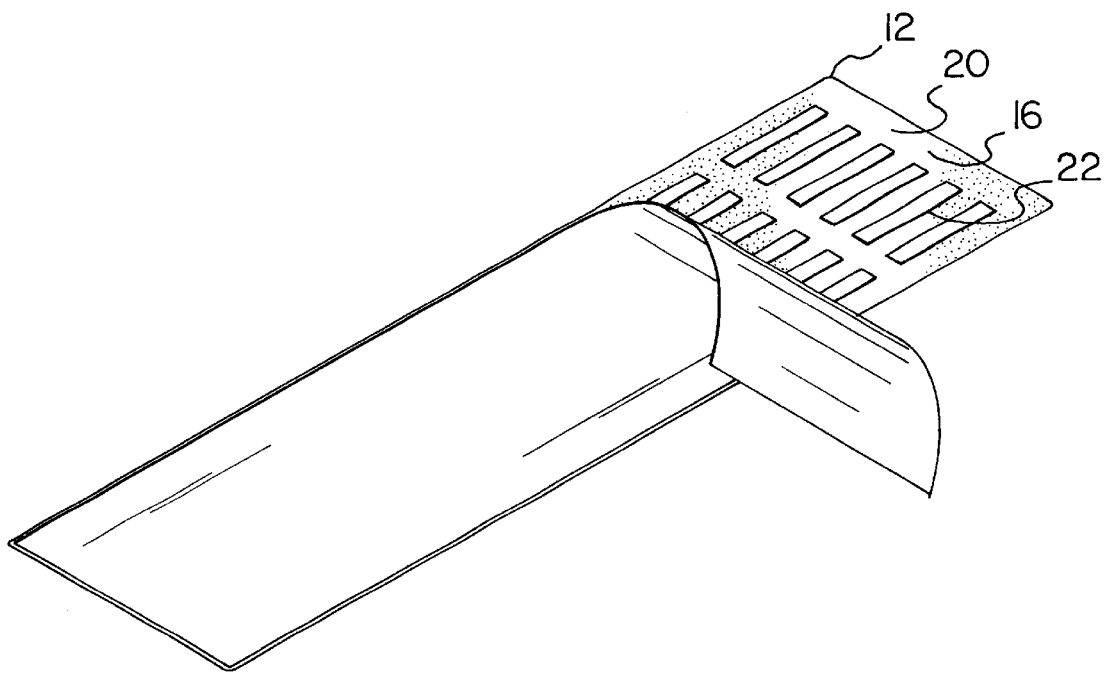
FIG. 4 is a lower perspective view of one of the louver strips of the present invention.
Figure 5:
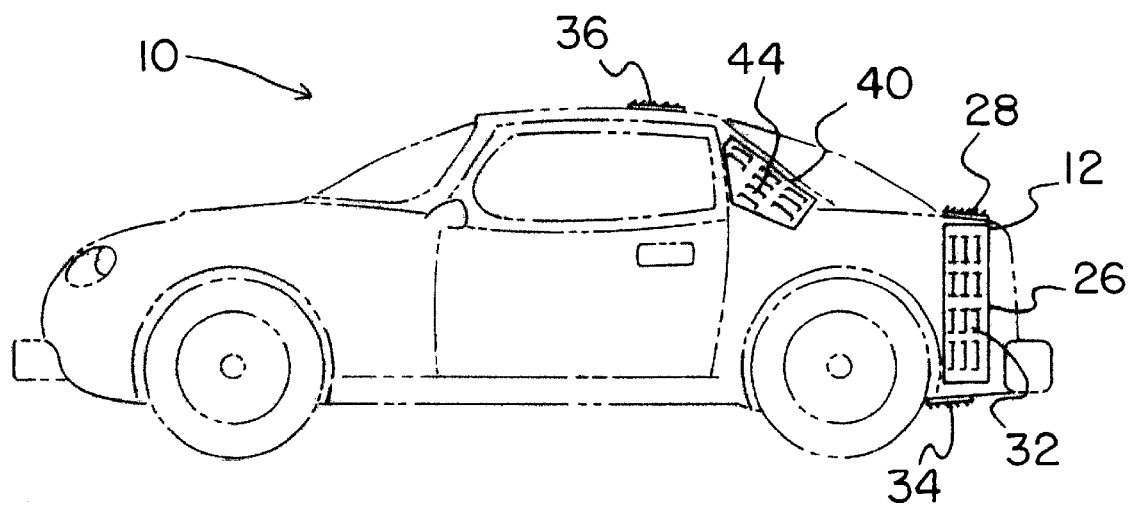
FIG. 5 is a side view of a second side of the vehicle shown in FIG. 1.

As shown in FIGS. 3 & 4, a plurality of louver strips 12 are provided each including a top face 14, a bottom face 16, and a periphery 18 formed therebetween. Such strips are ideally constructed from a durable vinyl or plastic. Each louver strips includes a layer of adhesive 20 such as DUPONT duo-faced tape formed on the entire bottom face thereof for allowing coupling to a body of a vehicle. It should be understood that, in the alternative, the louver strips may be attached to the vehicle by way of rivets or integrally upon manufacturing.

Each of the louver strips further include a plurality of rectangular cutouts 22 formed therein. Associated with each cut out is a rectangular louver tab 24 having a long side edge thereof integrally coupled along and coincident with a front long edge of the corresponding rectangular cut. As shown in FIG. 3, each louver tab extends upwardly and rearwardly thereby forming an approximate 45 degree angle with respect to a plane in which the louver strip resides. Preferably, each louver tab defines a right triangle with a base and height of approximately ½ of an inch. Further, the louver strips are ideally of a thickness of about $1/16$ of an inch and have a length of about 5 inches. Note should be taken that the dimensions set forth in the present description are tailored for use with automobiles and that such dimensions must be augmented for larger vehicles such as vans and the like.

As shown in FIG. 1, the louver strips include a first set of louver strips 26 each having a rectangular configuration. The louver strips of the first set have a width of about 5 inches. The rectangular cut outs and louver tabs of the first set of louver strips are situated in a matrix of rows and columns. Preferably, the columns and rows are spaced about ½ an inch.

The first set of louver strips include a first louver strip 28 adhered to a top surface of a trunk of the vehicle, a second louver strip 30 adhered to a first rear side panel of the body of the vehicle, a third louver strip 32 adhered to a second rear side panel of the body of the vehicle, and a fourth louver strip 34 adhered to a lower surface of the vehicle. The forgoing strips thus define a vertically orientated closed loop which encompasses the rear of the vehicle. To accomplish this, each of the louver strips of the first set has ends that are situated adjacent each other.

While not shown, the fourth lover strip has associated therewith a mounting plate that is mounted to an undercarriage of the vehicle by way of fasteners or brackets. Such mounting plate allows the adhering of the louver strips thereto. The first set of louver strips further include a fifth louver strip 36 adhered to a top surface of a passenger compartment of the vehicle adjacent a rear extent thereof.

Next provided is a second set of louver strips 40 each having a generally triangular configuration. Preferably, such louver strips are added as a manufacturer option for aesthetic purposes. Similar to the first set, the second set of louver strips have rectangular cut outs and louver tabs which are situated in a matrix of rows and columns. The second set of louver strips including a first louver strip 42 coupled to a first rear side panel of the passenger compartment of the vehicle and a second louver strip 44 coupled to a second rear side panel of the passenger compartment of the vehicle. It should be noted that the louver tabs of the first and second set of louver strips are situated on the vehicle such that they are angled toward a rear of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle air drag reduction system using louvers comprising, in combination:

a plurality of louver strips each including a top face, a bottom face, and a periphery formed therebetween, each louver strip further including a layer of adhesive formed on the bottom face thereof for allowing the coupling thereof to a body of a vehicle, a plurality of rectangular cut outs formed in the strip, and a rectangular louver tab having a long side edge thereof integrally coupled along and coincident with a front long edge of each rectangular cut, each louver tab extending upwardly and rearwardly thereby forming an approximate 45 degree angle with respect to a plane in which the louver strip resides, the louver strips including:

a first set of louver strips each having a rectangular configuration and with the rectangular cut outs and louver tabs thereof situated in a matrix of rows and columns, the first set of louver strips including a first louver strip adhered to a top surface of a trunk of the vehicle, a second louver strip adhered to a first rear side panel of the body of the vehicle, a third louver strip adhered to a second rear side panel of the body of the vehicle, a fourth louver strip adhered to a lower surface of the vehicle, and a fifth louver strip adhered to a top surface of a passenger cabin of the vehicle adjacent a rear of the top surface of the passenger cabin, wherein the louver tabs of the louver strips are angled toward a rear of the vehicle, and a second set of louver strips each having a generally triangular configuration with the rectangular cut outs and louver tabs thereof situated in a matrix of rows and columns, the second set of louver strips including a first louver strip coupled to a first rear side panel of the passenger compartment of the vehicle and a second louver strip coupled to a second rear side panel of the passenger compartment of the vehicle, wherein the louver tabs of the louver strips are angled toward a rear of the vehicle;

the coupling means comprising an adhesive applied on the bottom face of the louver strip;

the adhesive being substantially uniformly applied to an entirety of the bottom face of the louver strip;

the adhesive comprising a tape substrate having adhesive applied to both side of the tape substrate; and wherein a portion of the louver strip extends between each of the louver tabs and the cutouts, the adhesive being located on the bottom face of said portions of the louver strip for coupling said portions of the louver strip to a surface of the body of the vehicle.

* * * * *